United States Patent
Srivastava et al.

(10) Patent No.: US 7,179,402 B2
(45) Date of Patent: Feb. 20, 2007

(54) PHOSPHORS CONTAINING PHOSPHATE AND/OR BORATE OF METALS OF GROUP IIIA, GROUP IVA, AND LANTHANIDE SERIES, AND LIGHT SOURCES INCORPORATING THE SAME

(75) Inventors: Alok Mani Srivastava, Niskayuna, NY (US); Holly Ann Comanzo, Niskayuna, NY (US); William Winder Beers, Chesterland, OH (US)

(73) Assignee: General Electric Company, Niskayuna, NY (US)

( * ) Notice: Subject to any disclaimer, the term of this patent is extended or adjusted under 35 U.S.C. 154(b) by 367 days.

(21) Appl. No.: 10/768,792

(22) Filed: Feb. 2, 2004

(65) Prior Publication Data

US 2005/0168125 A1    Aug. 4, 2005

(51) Int. Cl.
C09K 11/08 (2006.01)
H01J 61/44 (2006.01)

(52) U.S. Cl. .............................. 252/301.4 F; 313/486; 313/487

(58) Field of Classification Search ......... 252/301.4 R, 252/301.4 F, 301.4 P, 301.4 H; 428/917; 313/486, 487, 503
See application file for complete search history.

(56) References Cited

U.S. PATENT DOCUMENTS

| 4,112,194 A | 9/1978 | Chenoi et al. |
| 4,423,349 A | 12/1983 | Nakajima et al. |
| 4,507,560 A | 3/1985 | Mathers et al. |
| 4,565,948 A * | 1/1986 | Kimura et al. ............. 313/487 |
| 4,747,374 A | 5/1988 | Stadler |
| 5,091,110 A | 2/1992 | Fan et al. |
| 5,154,852 A | 10/1992 | Chau |
| 5,156,764 A | 10/1992 | Kaneda et al. |
| 5,422,040 A | 6/1995 | Maofu et al. |
| 5,438,234 A | 8/1995 | Fujino |
| 6,153,971 A | 11/2000 | Shimizu et al. |
| 6,224,240 B1 | 5/2001 | Shimizu et al. |
| 6,242,857 B1 | 6/2001 | Hashimoto et al. |
| 6,419,852 B1 | 7/2002 | Braconnier et al. |
| 6,597,104 B2 | 7/2003 | Otsuka |

FOREIGN PATENT DOCUMENTS

| GB | 2124243 A * | 2/1984 |
| JP | 545608 | 5/1979 |

* cited by examiner

Primary Examiner—Ashok Patel
Assistant Examiner—Christopher M. Raabe
(74) Attorney, Agent, or Firm—Jason K. Klindtworth; Jean K. Testa (57) ABSTRACT

A phosphor comprises an oxide that comprises: (a) at least an element selected from the group consisting of phosphorus and boron; (b) at least a metal selected from the group consisting of elements of Group IIIA, elements of Group IVA, and elements of the lanthanide series; which oxide is co-activated with $Ce^{3+}$ and $Tb^{3+}$. In one embodiment, a phosphor comprises lanthanum and gadolinium phosphate and/or borate co-activated with cerium and terbium. A phosphor of the present invention has low emission of UV radiation having wavelengths longer than about 250 nm, thus efficiently uses exciting UV having shorter wavelengths. The phosphor is used in light source that comprises a UV radiation source to convert efficiently UV radiation to visible light.

6 Claims, 3 Drawing Sheets

PHOSPHORS CONTAINING PHOSPHATE AND/OR BORATE OF METALS OF GROUP IIIA, GROUP IVA, AND LANTHANIDE SERIES, AND LIGHT SOURCES INCORPORATING THE SAME

BACKGROUND OF THE INVENTION

This invention relates photoluminescent materials (or phosphors) and lighting technology. In particular, this invention relates to phosphors containing phosphate and/or borate of metals of Group IIIA, Group IVA and lanthanide series, and to light sources incorporating such phosphors.

A phosphor is a luminescent material that absorbs radiation energy in a portion of the electromagnetic spectrum and emits energy in another portion of the electromagnetic spectrum. Phosphors of one important class are crystalline inorganic compounds of high chemical purity and of controlled composition to which small quantities of other elements (called "activators") have been added to convert them into efficient fluorescent materials. With the right combination of activators and inorganic compounds, the color of the emission can be controlled. Most useful and well-known phosphors emit radiation in the visible portion of the electromagnetic spectrum in response to excitation by electromagnetic radiation outside the visible range. Well-known phosphors have been used in mercury vapor discharge lamps to convert ultraviolet ("UV") radiation emitted by the excited mercury vapor to visible light. Other phosphors are capable of emitting visible light upon being excited by electrons (used in cathode ray tubes) or X rays (for example, scintillators in X-ray detection systems).

Fluorescent lamps having high luminous output and color rendering indices ("CRI"), which are based on mercury discharge and used for illumination, typically include three phosphors that convert UV radiation of the mercury discharge into relatively narrow bands of blue, green, and red visible light, concentrated in the spectral regions where the human eye has the highest sensitivity (450, 540, and 610 nm). Lanthanum phosphate co-activated with terbium and cerium ($LaPO_4:Tb^{3+},Ce^{3+}$) has been a favorite green light-emitting phosphor, having a large peak emission at about 543 nm. $Ce^{3+}$ ions act as an efficient sensitizer to $Tb^{3+}$ ions. Energy is transferred from $Ce^{3+}$ ions to $Tb^{3+}$ ions, thus giving an efficient emission under UV excitation. However, the UV output is still relatively high because the $Ce^{3+}$—$Ce^{3+}$ energy transfer is more than the $Ce3+$–$Tb^{3+}$ energy transfer.

Therefore, it is very desirable to provide efficient green light-emitting phosphors that emit in a narrow band near 540 nm, at which the human eye is more sensitive, and that emit little in the UV range. It is also very desirable to use such green light-emitting phosphors to produce light sources having high energy efficiency and high CRIs.

SUMMARY OF THE INVENTION

The present invention provides phosphors that comprise: (a) at least an element selected from the group consisting of phosphorus and boron; (b) at least a metal selected from the group consisting of elements of Group IIIA and Group IVA of the Periodic Table of the elements, and elements of the lanthanide series; which oxide is co-activated with $Ce^{3+}$ and $Tb^{3+}$. A phosphor of the present invention has low emission of UV radiation having wavelengths longer than about 250 nm, thus uses exciting UV having shorter wavelengths.

According to one aspect of the present invention, the phosphor has a formula of $(La_{1-x-y-z}Tb_xCe_yGd_z)(P_{1-q}B_q)O_4$; wherein $0<x, y, z \leq 1$; $0 \leq q<1$; and $0<x+y+z<1$. In one embodiment, $0<q<1$. In another embodiment, $0<q \leq 0.2$. In still another embodiment, $0.2 \leq q<1$.

In another embodiment of the present invention, the phosphor has a formula of $(La_{1-x-y-z}Tb_xCe_yGd_z)(P_{1-p}B_q)O_4$; wherein $0<x, y<1$; $0<x+y+z<1$; $0 \leq q<1$; and $0.3<z<1$.

In another embodiment, the phosphor comprises a phosphate of lanthanum and gadolinium, which phosphate is co-activated with $Ce^{3+}$ and $Tb^{3+}$.

According to one aspect of the present invention, the phosphor has a formula of $(La_{1-x-y-z}Tb_xCe_yGd_z)PO_4$; wherein $0<x, y<1$; $0<x+y+z<1$; and $0.3<z<1$.

According to still another aspect of the present invention, the phosphor has a formula of $(La_{1-x-y-z-t}Tb_xCe_yGd_zJ_t)(P_{1-q}B_q)O_4$; wherein J is at least an element selecte from the group consisting of Ti, Zr, and Hf; $0<x, y, z, t<1$; $0 \leq q<1$; and $0<x+y+z+t<1$.

According to another aspect, the present invention provides a method for making a phosphor that comprises an oxide of: (a) at least an element selected from the group consisting of phosphorus and boron; (b) at least a metal selected from the group consisting of elements of Group IIIA, elements of Group IVA, and elements of lanthanides series. The phosphor is co-activated with cerium and terbium. The method comprises: (a) mixing oxygen-containing compounds of: (1) at least an element selected from the group consisting of phosphorus and boron; (2) at least an element selected from the group consisting of elements of Group IIIA, elements of Group IVA, and elements of lanthanide series other than cerium and terbium; (3) cerium, and (4) terbium; and (b) firing the mixture in a reducing atmosphere at a temperature in a range from about 900 C to about 1300 C for a time sufficient to convert the mixture to the phosphor.

According to another aspect, a method for making a phosphor comprises: (a) providing a first solution that comprises compounds of: (1) at least a first element selected from the group consisting of phosphorus and boron; (2) at least a second element selected from the group consisting of elements of Group IIIA, elements of Group IVA, and elements of lanthanide series other than cerium and terbium; (3) cerium, and (4) terbium; (b) combining the first solution and a second solution, the second solution comprising at least a compound selected from the group consisting of ammonium hydroxide; hydroxides of at least one element selected from the group consisting of cerium, terbium, said elements of Group IIIA, Group IVA, and lanthanide series; organic esters; organic dicarboxylic acids; and organic amines to produce a precipitate; (c) heating the precipitate in an oxygen-containing atmosphere at a temperature in a range from about 700 C to about 1300 C for a time sufficient to convert the precipitate to an oxygen-containing material that comprises said at least a first element, said at least a second element, cerium, and terbium; and (d) firing said oxygen-containing material in a reducing atmosphere at a temperature in a range from about 900 C to about 1300 C for a time sufficient to convert said oxygen-containing material to the phosphor.

According to still another aspect of the present invention, a method for making a phosphor comprises: (a) providing a first solution that comprises compounds of: (1) at least an element selected from the group consisting of elements of Group IIIA, elements of Group IVA, and elements of lanthanide series other than cerium and terbium; (2) cerium, and (3) terbium; (b) combining the first solution and a second solution, the second solution comprising at least a compound selected from the group consisting of ammonium hydroxide; hydroxides of at least one element selected from the group consisting of cerium, terbium, said elements of Group IIIA, elements of Group IVA, and lanthanide series; organic esters; organic dicarboxylic acids; phosphoric acid; and organic amines to produce a precipitate; (c) heating the precipitate in an oxygen-containing atmosphere at a temperature in a range from about 700 C to about 1300 C for a time sufficient to convert the precipitate to an oxygen-containing material that comprises said at least an element selected from the group consisting of elements of Group IIIA, elements of Group IVA, and elements of lanthanide series, cerium, and terbium; (d) combining said oxygen-containing material with a at least an oxygen-containing compound of at least one of phosphorus and boron; and (e) firing said oxygen-containing material in a reducing atmosphere at a temperature in a range from about 900 C to about 1300 C for a time sufficient to convert said oxygen-containing material to the phosphor.

According to still another aspect, a visible light source comprises: (a) a source of UV radiation; and (b) a phosphor comprising an oxide of: (1) at least an element selected from the group consisting of phosphorus and boron; (2) at least a metal selected from the group consisting of elements of Group IIIA, elements of Group IVA, and elements of lanthanides series; said phosphor being co-activated with cerium and terbium; wherein the phosphor absorbs at least a portion of the UV radiation and emits visible light.

Other features and advantages of the present invention will be apparent from a perusal of the following detailed description of the invention and the accompanying drawings in which the same numerals refer to like elements.

It should be understood that the drawings are included only for illustration purposes, are not intended to limit the invention in any way, and are not drawn to scale.

DETAILED DESCRIPTION OF THE INVENTION

In general, the present invention provides phosphors that comprise: (a) at least an element selected from the group consisting of phosphorus and boron; (b) at least a metal selected from the group consisting of elements of Group IIIA, elements of Groups IVA, and elements of the lanthanide series; which oxide is co-activated with $Ce^{3+}$ and $Tb^{3+}$. A phosphor of the present invention has low emission of UV radiation having wavelengths longer than about 250 nm, thus uses exciting UV having shorter wavelengths. The phosphors of the present invention are excitable by radiation in the UV range (i.e., having wavelengths in the range from about 200 nm to about 400 nm) to emit in the visible light having wavelengths from about 450 nm to about 650 nm. As used herein, elements of Group IIIA consist of Sc, Y, La, and Ac; and elements of Group IVA consist of Ti, Zr, and Hf.

In one embodiment of the present invention, the phosphors emit substantially in the wavelength range from about 500 nm to about 600 nm. The greatest portion of light emitted by a phosphor of the present invention, as measured by the luminous output, has wavelengths in the range from about 520 nm to about 570 nm, more particularly from about 530 nm to about 560 nm.

According to one aspect of the present invention, the phosphor has a formula of $(La_{1-x-y-z}Tb_xCe_yGd_z)(P_{1-q}B_q)O_4$; wherein $0<x$, $y$, $z<1$; $0 \leq q<1$; and $0<x+y+z<1$. In one embodiment, $0<q<1$. In another embodiment, $0<q \leq 0.2$. In another embodiment, $0.2 \leq q<1$.

In another embodiment of the present invention, the phosphor has a formula of $(La_{1-x-y-z}Tb_xCe_yGd_z)(P_{1-q}B_q)O_4$; wherein $0<x$, $y<1$; $0<x+y+z<1$; $0 \leq q<1$; and $0.3<z<1$. In one embodiment of this phosphor, $0<q \leq 0.2$, and $0.3<z<1$. In another embodiment of this phosphor, $0.2<q<1$, and $0.3<z<1$.

In another embodiment, the phosphor comprises a phosphate of lanthanum and gadolinium, which phosphate is co-activated with $Ce^{3+}$ and $Tb^{3+}$.

According to one aspect of the present invention, the phosphor has a formula of $(La_{1-x-y-z}Tb_xCe_yGd_z)PO_4$; wherein $0<x$, $y<1$; $0<x+y+z<1$; and $0.3<z<1$.

In one embodiment, the phosphor has a formula of $(La_{1-x-y-z}Tb_xCe_yGd_z)(P_{1-q}B_q)O_4$; wherein q is in the range from about 0.2 to less than 1; x is from about 0.005 to about 0.3, preferably from about 0.005 to about 0.2; z is from about 0.3 to about 0.9, preferably from about 0.3 to about 0.8, and more preferably from about 0.4 to about 0.7; y is from about 0.005 to about 0.3, preferably from about 0.01 to about 0.2; and $0<x+y+z<1$.

In still another embodiment, the phosphor has a formula of $(La_{1-y-z}Tb_xCe_yGd_z)PO_4$; wherein x is from about 0.005 to about 0.3, preferably from about 0.005 to about 0.2; z is from about 0.3 to about 0.9, preferably from about 0.3 to about 0.8, and more preferably from about 0.4 to about 0.7; y is from about 0.005 to about 0.3, preferably from about 0.01 to about 0.2; and $0<x+y+z<1$.

In still another embodiment of the present invention, the phosphor has a formula of $(La_{1-x-y-z}Tb_xCe_yGd_zD_uE_v)(P_{1-q}B_q)O_4$; wherein D is at least an element selected from the group consisting of Pr, Nd, Sm, Eu, Dy, Ho, Er, Tm, and Yb; E is at least an element selected from the group consisting of Sc, Y, and Lu; $0 \leq q<1$, preferably in the range from about 0.005 to less than 0.2; x is from about 0.005 to about 0.3, preferably from about 0.005 to about 0.2; z is in a range from about 0.3 to about 0.9, preferably from about 0.3 to about 0.8, and more preferably from about 0.4 to about 0.7; y is in a range from about 0.005 to about 0.2, preferably from about 0.01 to about 0.1; u is in a range from about $10^{-9}$ to about 0.1, preferably from about 0.001 to about 0.05; v is a range from about $10^{-9}$ to about 0.2, preferably from about 0.001 to about 0.05; and $0<x+y+z+u+v<1$.

In yet another embodiment, D is selected from the group consisting of Pr, Dy, Nd, Er, and combinations thereof.

In yet another embodiment, D is Dy, and E is Y.

In still another embodiment of the present invention, the phosphor has a formula of $(La_{1-x-y-z-t}Tb_xCe_yGd_zJ_t)(P_{1-q}B_q)O_4$; wherein J is at least an element of Group IVA (i.e., the group consisting of Ti, Zr, and Hf); $0 \leq q<1$, preferably in the range from about 0.005 to less than 0.2; x is from about 0.005 to about 0.3, preferably from about 0.005 to about 0.2; z is in a range from about 0.3 to about 0.9, preferably from about 0.3 to about 0.8, and more preferably from about 0.4 to about 0.7; y is in a range from about 0.005 to about 0.2, preferably from about 0.01 to about 0.1; t is in a range from about $10^{-9}$ to about 0.05, preferably from about 0.0001 to about 0.02; and $0<x+y+z+t<1$.

According to still another aspect of the present invention, the phosphor has a formula of $(La_{1-x-y-z-t}Tb_xCe_yGd_zZr_t)(P_{1-q}B_q)O_4$; wherein $0<x, y, z, t<1$; $0 \leq q<1$; and $0<x+y+z+t<1$.

In still another embodiment, this phosphor is further doped with at least an element selected from at least a first group and a second group, wherein the first group consists of Sc, Y, and Lu; and the second group consists of Pr, Nd, Sm, Eu, Dy, Ho, Er, Tm, and Yb.

In yet another embodiment, the phosphor has a formula of $(La_{0.1}Tb_{0.15}Ce_{0.05}Gd_{0.7})PO_4$.

In yet another embodiment, the phosphor has a formula of $(La_{0.2}Tb_{0.15}Ce_{0.05}Gd_{0.6})PO_4$.

In yet another embodiment, the phosphor has a formula of $(La_{0.25}Tb_{0.15}Ce_{0.01}Gd_{0.5})PO_4$.

The present invention also provide methods for making a phosphor that comprises an oxide of: (a) at least an element selected from the group consisting of phosphorus and boron; (b) at least a metal selected from the group consisting of elements of Group IIIA, elements of Group IVA, and elements of lanthanides series. The phosphor is co-activated with cerium and terbium. A phosphor of the present invention can be produced by a dry method or a wet method. The dry method comprises: (a) mixing oxygen-containing compounds of: (1) at least an element selected from the group consisting of phosphorus and boron; (2) at least an element selected from the group consisting of elements of Group IIIA, elements of Group IVA, of the Periodic Table and elements of lanthanide series other than cerium and terbium; (3) cerium, and (4) terbium to form a mixture; and (b) firing the mixture in a reducing atmosphere at a temperature in a range from about 900 C to about 1300 C for a time sufficient to convert the mixture to the phosphor.

In one aspect of the method of the present invention, said at least an element selected from the group consisting of elements of Group IIIA and elements of lanthanide series comprises La and Gd.

The oxygen-containing compounds may be mixed together by any mechanical method including, but not limited to, stirring or blending in a high-speed blender or a ribbon blender. The oxygen-containing compounds may be combined and pulverized together in a bowl mill, a hammer mill, or a jet mill. The mixing may be carried out by wet milling especially when the mixture of the oxygen-containing compounds is to be made into a solution for subsequent precipitation. If the mixture is wet, it may be dried first before being fired to a temperature in the range from about 900 C to about 1300 C. The drying may be carried out at ambient atmosphere or under a vacuum. The firing may be conducted in a batch wise or continuous process, preferably with a stirring or mixing action to promote good gas-solid contact. A firing time in a range from about 1 minute to about 10 hours is adequate. It should be noted that the firing time can depend on the amount of material being treated to produce the phosphor, or on the extent of contact between the solid and the gas of the atmosphere, or on the degree of mixing while the mixture is fired or heated. Preferably, the temperature is in the range from about 900 C to about 1200 C.

The mixture can be rapidly brought to and held at the final temperature. Alternatively, the mixture may be heated up to the final temperature at a lower rate, such as from about 10 C/minute to about 200 C/minute, preferably from about 10 C/minute to about 100 C/minute.

The reducing atmosphere comprises a reducing gas, such as hydrogen, carbon monoxide, ammonia, hydrazine, or a mixture of one of these compounds with an inert gas selected from the group consisting of nitrogen, helium, argon, krypton, xenon, and combinations thereof. A preferred reducing gas is a mixture of hydrogen and nitrogen containing hydrogen in an amount from about 0.5 volume percent to about 10 volume percent. Alternatively, the reducing gas mixture is generated by a reaction between the residual oxygen in the reactor or firing chamber and carbon particles packed therein to scavenge this residual oxygen.

In a preferred embodiment, the mixture of starting materials for producing the phosphor also comprises a flux, such as lithium tetraborate, lithium carbonate, or a mixture thereof with an alkali phosphate or alkali hydrogen phosphate (such as lithium, sodium, or potassium phosphate or hydrogen phosphate).

According to another aspect of the present invention, the flux may comprise at least a halide compound of an element selected from the group consisting of said elements of Group IIIA, elements of Group IVA, said elements of the lanthanide series, cerium, and terbium. In one embodiment, the halide compound is a fluoride. The halide compound acts as a flux during the firing step and can comprise up to about 10 percent by weight of the mixture.

The oxygen-containing compounds of Group-IIIA elements, Group-IVA elements, and elements of the lanthanide series may be selected from the group consisting of oxides, carbonates, nitrates, sulfates, phosphates, citrates, carboxylates (salts of carboxylic acids), and combinations thereof. Lower carboxylates (e.g., having from one to five carbon atoms, inclusive), such as acetates, may be desirable.

Non-limiting examples of oxygen-containing compounds of phosphorus and boron are ammonium hydrogen phosphate; ammonium dihydrogen phosphate; ammonium hydrogen borate trihydrate; alkali (such as sodium or potassium) hydrogen phosphate; boric acid; and alkali (such as sodium or potassium) tetraborate tetrahydrate, pentahydrate, or decahydrate. When an alkali phosphate or borate is used, it may be desired to wash the phosphor after the step of firing to remove any soluble alkali compounds from the phosphor.

According to another aspect, a method for making a phosphor comprises: (a) providing a first solution that comprises compounds of: (1) at least a first element selected from the group consisting of phosphorus and boron; (2) at least a second element selected from the group consisting of elements of Group IIIA, elements of Group IVA, and elements of lanthanide series other than cerium and terbium; (3) cerium, and (4) terbium; (b) combining the first solution and a second solution, the second solution comprising at least a compound selected from the group consisting of ammonium hydroxide; hydroxides of at least one element selected from the group consisting of cerium, terbium, said elements of Group IIIA, Group IVA, and lanthanide series; organic esters; organic dicarboxylic acids; phosphoric acid; and organic amines to produce a precipitate; (c) heating the precipitate in an oxygen-containing atmosphere at a temperature in a range from about 700 C to about 1300 C for a time sufficient to convert the precipitate to an oxygen-containing material that comprises said at least a first element, said at least a second element, cerium, and terbium; and (d) firing said oxygen-containing material in a reducing atmosphere at a temperature in a range from about 900 C to about 1300 C for a time sufficient to convert said oxygen-containing material to the phosphor.

In one embodiment, the first solution is simply an aqueous solution if the compounds of said at least a first element, said at least a second element, cerium, and terbium, if these compounds are readily dissolved in water.

In another embodiment, oxides or other oxygen-containing compounds of said first element, said second element, cerium, and terbium are dissolved in an acidic solution to form the first solution, such as hydrochloric acid, nitric acid, sulfuric acid, citric acid, or acetic acid. The strength of the acid solution is chosen to rapidly dissolve the oxides or the oxygen-containing compounds, and the choice is within the skill of a person skilled in the art. The second solution (e.g., ammonium hydroxide) is then added in increments to the first solution while stirring to precipitate a mixture of oxygen-containing compounds of said first element, said second element, cerium, and terbium. An organic base; such as methanolamine, ethanolamine, propanolamine, dimethanolamine, diethanolamine, dipropanolamine, trimethanolamine, triethanolamine, or tripropanolamine; may be used in place of ammonium hydroxide. Alternatively, an ester of an organic acid may be used to carry out the precipitation; such as methyl, ethyl, or propyl esters of acetic acid, propionic acid, butyric acid, oxalic acid, malonic acid, succinic acid, or glutaric acid; dimethyl, diethyl, dipropyl esters of oxalic acid, malonic acid, succinic acid, or glutaric acid. Alternatively, an organic acid selected from the group consisting of oxalic acid, malonic acid, succinic acid, and glutaric acid, may be used to produce the precipitate. The precipitate is filtered, washed with deionized water, and optionally dried. The dried precipitate is ball milled or otherwise thoroughly blended and then fired in said reducing atmosphere at a temperature in the range from about 900 C to about 1300 C, preferably from about 1000 C to about 1200 C. Alternatively, the wet precipitate can be heated or fired first, and then ball milled or otherwise thoroughly blended afterward.

In one embodiment of the method of the present invention a flux is included in the first solution. A flux is selected from the group disclosed above in conjunction with the dry method.

The oxygen-containing atmosphere for the heating step (c) can be air; oxygen; a mixture of oxygen and an inert gas selected from the group consisting of nitrogen, helium, argon, krypton, xenon, and combinations thereof; $NO_x$; or $SO_x$. The oxygen-containing atmosphere can comprise a gas that decomposes to give an oxygen-containing compound at the heating temperature. The heating time for step (c) is in the range from about 1 minute to about 10 hours.

The reducing atmosphere comprises a reducing gas selected from the group consisting of hydrogen, carbon monoxide, ammonia, hydrazine, and mixtures of one of these compounds with an inert gas selected from the group consisting of nitrogen, helium, argon, krypton, xenon, and combinations thereof. A preferred reducing gas is a mixture of hydrogen and nitrogen containing hydrogen in an amount from about 0.5 volume percent to about 10 volume percent. A firing time in a range from about 1 minute to about 10 hours is adequate. It should be noted that the firing time can depend on the amount of material being treated to produce the phosphor, or on the extent of contact between the solid and the gas of the atmosphere, or on the degree of mixing while the mixture is fired.

According to still another aspect of the present invention, a method for making a phosphor comprises: (a) providing a first solution that comprises compounds of: (1) at least an element selected from the group consisting of elements of Group IIIA, elements of Group IVA, and elements of lanthanide series other than cerium and terbium; (2) cerium, and (3) terbium; (b) combining the first solution and a second solution, the second solution comprising at least a compound selected from the group consisting of ammonium hydroxide; hydroxides of at least one element selected from the group consisting of cerium, terbium, said elements of Group IIIA, Group IVA, and lanthanide series; organic esters; organic dicarboxylic acids; phosphoric acid; and organic amines to produce a precipitate; (c) heating the precipitate in an oxygen-containing atmosphere at a temperature in a range from about 700 C to about 1300 C for a time sufficient to convert the precipitate to an oxygen-containing material that comprises said at least an element selected from the group consisting of elements of Group IIIA, elements of Group IVA, and elements of lanthanide series, cerium, and terbium; (d) combining said oxygen-containing material with at least an oxygen-containing compound of at least one of phosphorus and boron; and (e) firing said oxygen-containing material in a reducing atmosphere at a temperature in a range from about 900 C to about 1300 C for a time sufficient to convert said oxygen-containing material to the phosphor.

In one embodiment, the first solution is simply an aqueous solution if the compounds of said elements of Group IIIA, said elements of Group IVA, said elements of the lanthanide series, cerium, and terbium are readily dissolved in water.

In another embodiment, oxides or other oxygen-containing compounds of said elements of Group IIIA, said elements of Group IVA, said elements of the lanthanide series, cerium, and terbium are dissolved in an acidic solution to form the first solution, such as hydrochloric acid, nitric acid, sulfuric acid, citric acid, or acetic acid. The strength of the acid solution is chosen to rapidly dissolve the oxides or the oxygen-containing compounds, and the choice is within the skill of a person skilled in the art. The second solution (e.g., ammonium hydroxide) is then added in increments to the first solution while stirring to precipitate a mixture of oxygen-containing compounds of said elements of Group IIIA, said elements of Group IVA, said elements of the lanthanide series, cerium, and terbium. An organic base; such as methanolamine, ethanolamine, propanolamine, dimethanolamine, diethanolamine, dipropanolamine, trimethanolamine, triethanolamine, or tripropanolamine; may be used in place of ammonium hydroxide. Alternatively, an ester of an organic acid may be used to carry out the precipitation; such as methyl, ethyl, or propyl esters of acetic acid, propionic acid, butyric acid, oxalic acid, malonic acid, succinic acid, or glutaric acid; dimethyl, diethyl, dipropyl esters of oxalic acid, malonic acid, succinic acid, or glutaric acid. Alternatively, an organic acid selected from the group consisting of oxalic acid, malonic acid, succinic acid, and glutaric acid, may be used in the second solution to produce the precipitate. The precipitate is filtered, washed with deionized water, and optionally dried. The dried precipitate may be ball milled or otherwise thoroughly blended before being combined with oxygen-containing compounds of phosphorus and/or boron, and then fired in said reducing atmosphere at a temperature in the range from about 900 C to about 1300 C, preferably from about 1000 C to about 1200 C.

Non-limiting examples of oxygen-containing compounds of phosphorus and boron are ammonium hydrogen phosphate; ammonium dihydrogen phosphate; ammonium hydrogen borate trihydrate; alkali (such as sodium or potassium) hydrogen phosphate; boric acid; and alkali (such as sodium or potassium) tetraborate tetrahydrate, pentahydrate, or decahydrate. When an alkali phosphate or borate is used, it may be desired to wash the phosphor after the step of firing to remove any soluble alkali compounds from the phosphor.

In one embodiment of the method of the present invention a flux is included in the first solution. A flux is selected from the group disclosed above in conjunction with the dry method.

EXAMPLE 1

The following quantities of oxygen-containing compounds were dry blended thoroughly for two hours in a rolling jar mill:
$La_2O_3$: 4.96 g
$Gd_2O_3$: 11.04g
$CeO_2$: 2.1 g
$Tb_4O_7$: 3.42 g
$(NH_4)_2HPO_4$: 16.42 g
$Na_2HPO_4$: 3.46 g
$Li_2B_4O_7$: 0.206 g The mixture was fired at 1000° C. for a total time of about 6 hours in a reducing atmosphere comprising hydrogen (0.5 volume percent) in nitrogen. After heating, the resulting material was crushed to size of about 4 micrometers and washed with water to remove any unreacted compounds that were soluble, and dried. The phosphor has a composition of $(Gd_{0.5}La_{0.25}Ce_{0.1}Tb_{0.15})PO_4$ and emits green visible light.

EXAMPLE 2

A first solution was prepared as follows. The following quantities were dissolved in 200 ml of 30% (by weight) aqueous $HNO_3$ solution while stirring and heating:
$Gd_2O_3$: 33.62 g
$La_2O_3$: 15.11 g
$Ce(NO)_3 \cdot 6H_2O$: 16.11 g
$Tb_4O_7$: 10.4 g When all of the solid was dissolved, the first solution was cooled down to room temperature. Eight hundred milliliters of water were added to the solution. A quantity of 74.83 g of oxalic acid was added to the first solution to form a precipitate comprising Gd, La, Ce, and Tb. The precipitate was separated, rinsed well with water, and dried. The dried precipitate was heated in air at about 1000° C. for two hours to form an oxide having a formula of $(Gd_{0.5}La_{0.25}Ce_{0.1}Tb_{0.15})_2O_3$. A quantity of 60 g of this oxide was blended with 32.83 g of diammonium hydrogen phosphate, 6.92 g of sodium hydrogen phosphate, and 0.41 g of lithium tetraborate, for two hours in a rolling jar mill. The mixture was then fired at about 1000° C. for about 6 hours under a reducing atmosphere that comprised hydrogen (0.5 volume percent) in nitrogen to produce a phosphor cake. The phosphor cake was crushed to particles of about 4 micrometers, washed with water, and dried to produce the final phosphor.

Other phosphors of the present invention can be prepared by the same dry method or by the wet method disclosed above.

In addition, a portion of lanthanum can be advantageously substituted with at least one rare earth metal other than gadolinium, cerium, and terbium. For example, lanthanum can be partially substituted with at least an element selected from the group consisting of Sc, Y, Pr, Nd, Sm, Eu, Dy, Ho, Er, Tm, Yb, and Lu. Preferably, lanthanum is substituted with at least one of Sc, Y, Dy, Er, and Pr. Preferably, the amount of Sc, Y, Dy, Er, and/or Pr is less than or equal to about 5 mole percent of the combined elements of Group IIIA, Group IVA, and the lanthanum series. In one embodiment, a portion of lanthanum is substituted with at least one element selected from the group consisting of Y and Dy up to about 5 mole percent of the combined elements of Group IIIA, elements of Group IVA, and elements of the lanthanum series.

Table 1 shows the quantum efficiency of some phosphors of the present invention. The quantum efficiency reported herein is a relative number compared to a commercial $LaPO_4:Ce^{3+},Tb^{3+}$ standard emitting in the green visible light region.

TABLE 1

| Composition | Preparation Method | Firing Temperature (C.) | Quantum Efficiency (% of standard phosphor) |
|---|---|---|---|
| $(La_{0.1}Tb_{0.15}Ce_{0.05}Gd_{0.7})PO_4$ | dry | 1000 | 100.3 |
| $(La_{0.25}Tb_{0.15}Ce_{0.1}Gd_{0.5})PO_4$ | dry | 1000 | 103.2 |
| $(La_{0.22}Tb_{0.15}Ce_{0.05}Gd_{0.6})PO_4$ | dry | 1000 | 102.1 |

Table 2 shows the characteristics and properties of phosphors prepared by the dry method of the present invention, wherein phosphorus is partially substituted with boron. The phosphors have a formula of $(La_{0.25}Tb_{0.15}Ce_{0.1}Gd_{0.5})(P_{1-q}B_q)O_4$ (q=0 for the control). (Note: "QE" is quantum efficiency, measured as percent of a standard commercial $LaPO_4:Ce^{3+},Tb^{3+}$ phosphor.)

TABLE 2

| q | QE | Relative Light Output at 250 C. (%, after phosphor has been annealed at 500 C. for 20 minutes) |
|---|---|---|
| 0 | 100 | 88 |
| 0.01 | 103 | 90 |
| 0.02 | 103 | 95 |
| 0.05 | 101 | 90 |
| 0.1 | 96 | 88 |
| 0.15 | 95 | 88 |
| 0.2 | 93 | 86 |

Table 3 shows the characteristics and properties of phosphors in which a portion of lanthanum was substituted with dysprosium. The phosphors of Table 3 were prepared by the dry method at 1000° C. The phosphors have the formula of $(La_{0.25-u}Tb_{0.15}Ce_{0.1}Gd_{0.5}Dy_u)PO_4$.

TABLE 3

| u | QE | Relative Light Output at 250 C. (%, after phosphor has been annealed at 500 C. for 20 minutes) |
|---|---|---|
| 0 | 100 | 88 |
| 0.001 | 103 | 92 |
| 0.005 | 103 | 84 |
| 0.01 | 97 | 74 |
| 0.05 | 47 | no data |

The color coordinates of the emission of some of the phosphors of Table 3 are shown in Table 4.

TABLE 4

| u | ccx | ccy |
|---|---|---|
| 0 | 0.3411 | 0.5769 |
| 0.005 | 0.3412 | 0.5751 |
| 0.01 | 0.3412 | 0.5736 |
| 0.05 | 0.3441 | 0.5644 |

Table 5 shows the characteristics and properties of phosphors in which a portion of lanthanum was substituted with erbium. The phosphors of Table 5 were prepared by the dry method at 1000° C. The phosphors have the formula of $(La_{0.25-u}Tb_{0.15}Ce_{0.1}Gd_{0.5}Er_u)PO_4$.

TABLE 5

| u | QE |
|---|---|
| 0 | 100 |
| 0.005 | 47 |
| 0.01 | 26 |
| 0.05 | 5 |

Table 6 shows the characteristics and properties of phosphors in which a portion of lanthanum was substituted with praseodymium. The phosphors of Table 6 were prepared by the dry method at 1000° C. The phosphors have the formula of $(La_{0.25-u}Tb_{0.15}Ce_{0.1}Gd_{0.5}Pr_u)PO_4$.

TABLE 6

| u | QE |
|---|---|
| 0 | 100 |
| 0.005 | 48 |
| 0.01 | 29 |
| 0.05 | 6 |

Table 7 shows the characteristics and properties of phosphors having the formula of $(La_{0.25-t}Tb_{0.15}Ce_{0.1}Gd_{0.5}Zr_t)PO_4$. The phosphors of Table 7 were prepared by the dry method at 1000° C.

TABLE 7

| t | QE | Relative Light Output at 250 C. (%, after phosphor has been annealed at 500 C. for 20 minutes) |
|---|---|---|
| 0 | 100 | 88 |
| 0.005 | 102 | 89 |
| 0.01 | 106 | 90 |

White Light-Emitting Device

Incorporation of a blend of phosphors that comprises a green light-emitting phosphor of the present invention (as has been disclosed herein above), a red light-emitting phosphor, and a blue light-emitting phosphor in a mercury discharge device provides a white light-emitting device that have a higher efficiency than prior-art devices because a green light-emitting phosphor of the present invention absorbs more efficiently UV radiation emitted by the mercury discharge.

Another green light-emitting phosphor may be used in addition to a phosphor of the present invention, if desired. Non-limiting examples of such other green light-emitting phosphors are $GdMgB_5O_{10}:Ce^{3+},Tb^{3+}$; $CeMgAl_{11}O_{19}:Ce^{3+}$, $Tb^{3+}$; $Ca_5(PO_4)_3(Cl,F,OH):Sb^{3+},Mn^{2+},Eu^{2+}$; $Sr_4Al_{14}O_{25}:Eu^{2+}$; and $BaAl_8O_{13}:Eu^{2+}$; combinations thereof.

Non-limiting examples of blue light-emitting phosphors are $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; and combinations thereof.

Non-limiting examples of red light-emitting phosphors are $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)AlO_9:Eu^{3+}$; $(Sr,Mg)_3(PO_4)_2:Sn^{2+}$; $GdMgB_5O_{10}:Ce^{3+},Mn^{2+}$; and $3.5MgO\cdot0.5MgF_2\cdot GeO_2:Mn^{4+}$.

Green light-emitting phosphors of the present invention emit light having a peak emission in the range from about 530 nm to about 560 nm, to which the human eye is most sensitive. Blue light-emitting phosphors used in a phosphor blend of the present invention preferably emit light having a peak emission in the range from about 420 nm to about 500 nm. Red light-emitting phosphors preferably emit light having a peak emission in the wavelength range from about 600 nm to about 625 nm.

Figure 1:
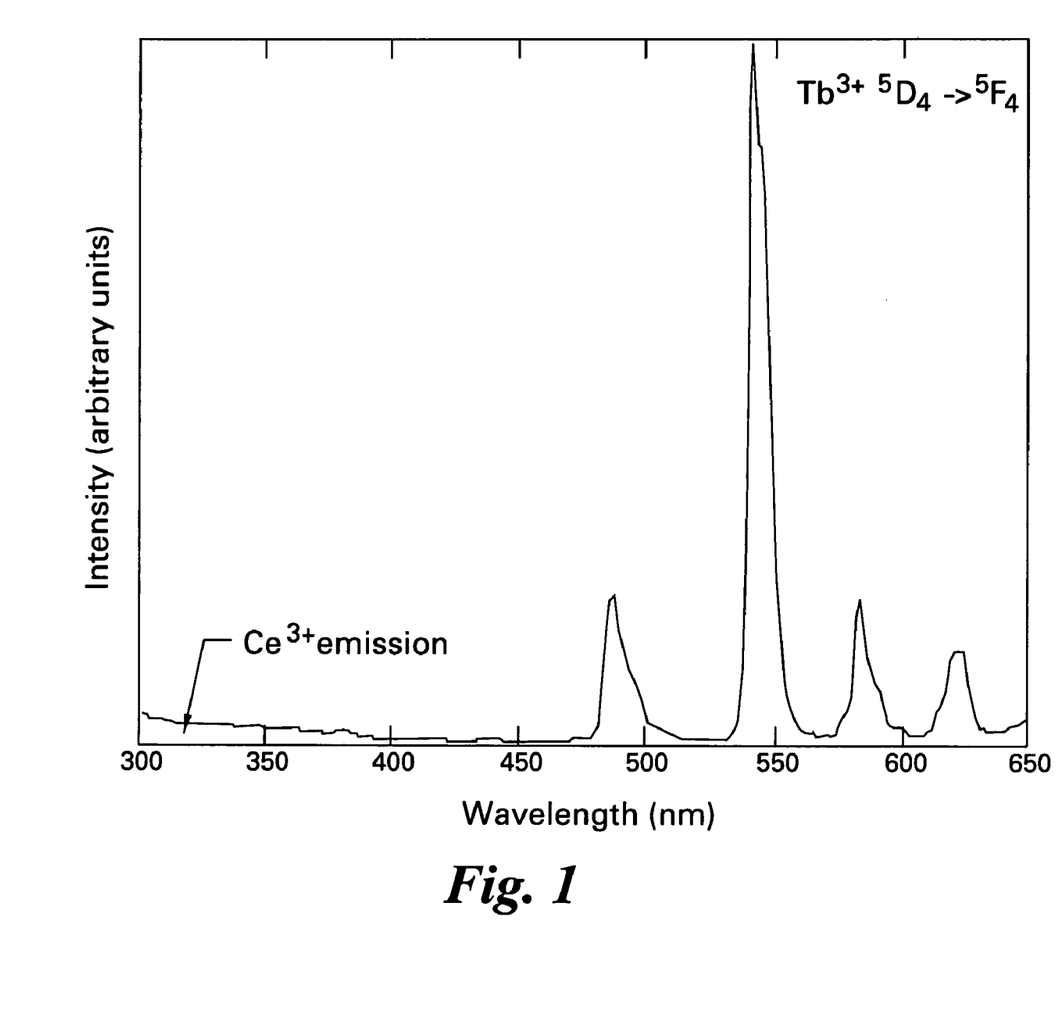
FIG. 1 shows the emission spectrum of a $(La,Gd)PO_4$: $Ce^{3+},Tb^{3+}$ phosphor of the present invention.
Figure 2:
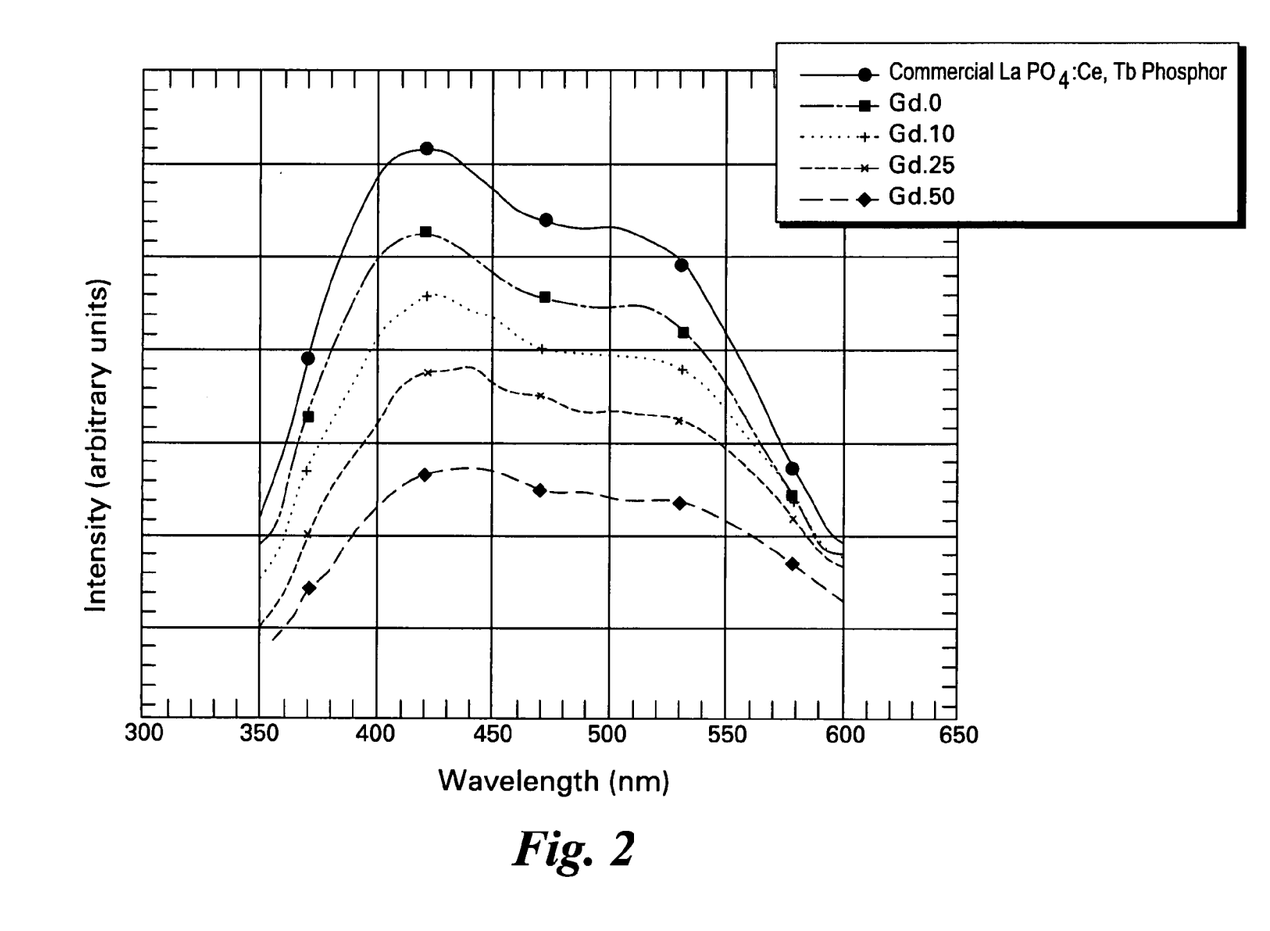
FIG. 2 shows the effect of increasing Gd substitution in $(La,Gd)PO_4:Ce^{3+},Tb^{3+}$ phosphors on UV radiation emission.
Figure 3:
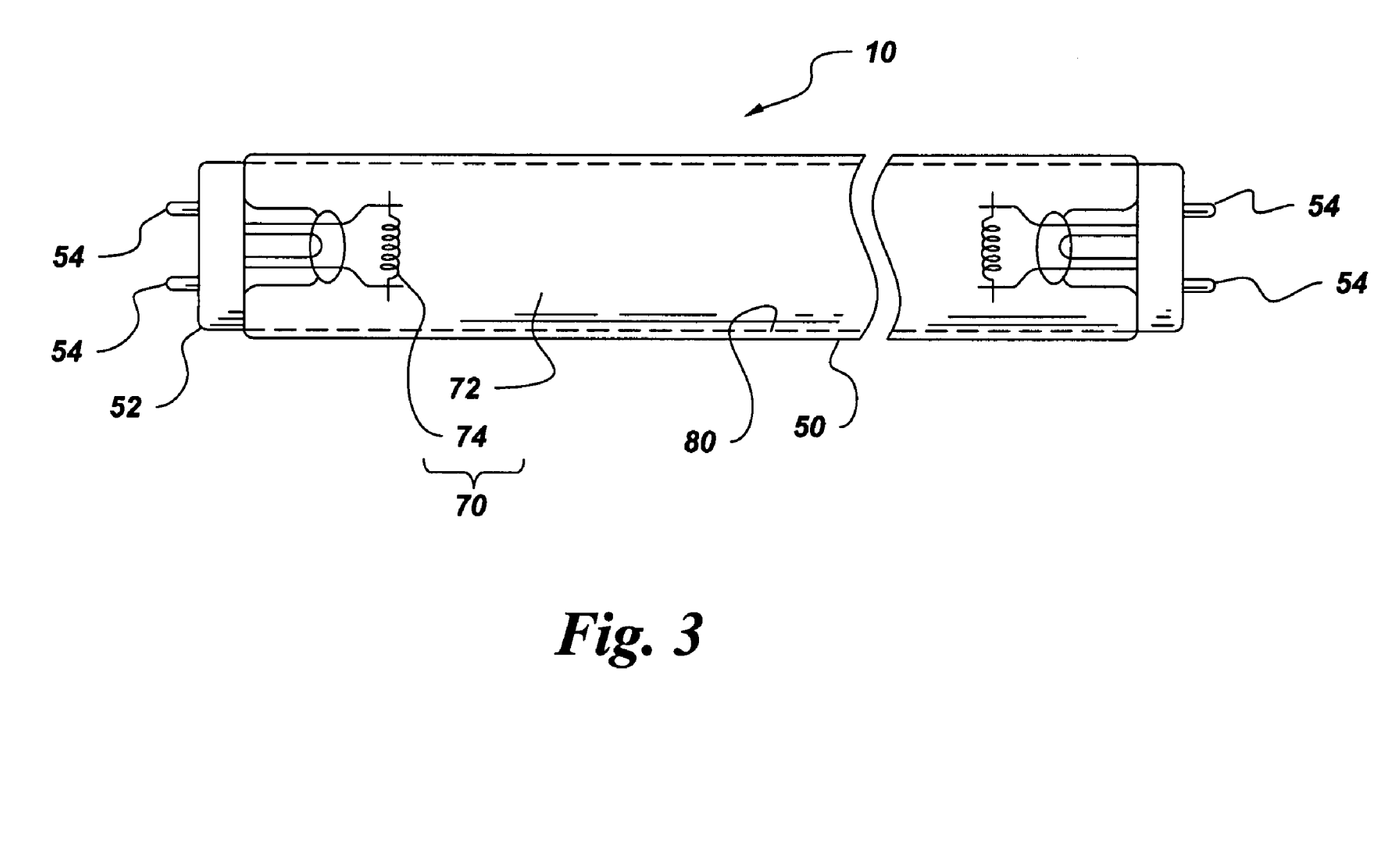
FIG. 3 shows schematically a light source that incorporates a phosphor of the present invention.

In one embodiment of the present invention, a light source 10, which produces white light with a high CRI suitable for general illumination (e.g., CRI in the range from about 80 to about 100), is shown in FIG. 3. Light source 10 comprises an evacuated sealed housing 50, a means 70 for generating UV radiation, which means is located within housing 50, and a phosphor blend 80 located within housing 50 and adapted to be excited by UV radiation. In one embodiment, light source 10 is a fluorescent lamp and evacuated housing 50 comprises an evacuated glass tube and associated end caps 52. In another embodiment, the phosphor blend is disposed on an inner surface of housing 50. Means 70 for generating UV radiation is a combination of a gas comprising a means 74 for generating high-energy electrons and a means 72 for absorbing the energy of the high-energy electrons. In one embodiment, means 72 for absorbing energy of high-energy electrons is a gas comprising mercury vapor, which absorbs energy of the high-energy electrons to create a mercury vapor discharge to excite the phosphor. In addition to mercury vapor, the gas can comprise an inert gas such as argon, krypton, or xenon. Means 74 for generating high-energy electrons may be a filament of a metal having a low work function (such as less than 4.5 eV), such as tungsten, or such a filament coated with alkaline earth metal oxides as are known in the art. Pins 54 are provided to supply electrical power to electron-generating means 74. The filament is coupled to a high-voltage source to generate electrons from the surface thereof. A phosphor of the present invention may be used in combination with other conventional phosphors used in fluorescent lighting technology. For example, a phosphor of the present invention may be combined with conventional red, green, and blue light-emitting phosphors, which conventional phosphor are disclosed herein above, to produce white light from a mercury discharge lamp. A particulate material comprising $TiO_2$ and/or $Al_2O_3$ can be used in conjunction with the phosphor blend to scatter light generated by light source 10. Such a light scattering material can be blended into the phosphor blend or disposed as a layer between the inner surface of housing 50 and phosphor layer 80. Although light source 10 shown in FIG. 3 comprises a straight housing 50, it should be understood that other housing shapes also are applicable. For example, a compact fluorescent lamp can have a housing that has one or more bends, and electrical supply pins 54 are disposed at one end of light source 10.

A green light-emitting phosphor of the present invention also can be used as a component of a phosphor blend for cathode-ray tubes, which phosphor blend comprises blue light-emitting and green light-emitting phosphors. In this case, the high-energy electrons bombard a screen on which a coating of the phosphor blend is disposed to emit light in the visible spectral region.

While specific preferred embodiments of the present invention have been described in the foregoing, it will be appreciated by those skilled in the art that many modifications, substitutions, or variations may be made thereto without departing from the spirit and scope of the invention as defined in the appended claims.

What is claimed is:

1. A phosphor comprising a material having a formula of $(La_{1-x-y-z}Tb_xCe_yGd_z)(P_{1-q}B_q)O_4$; wherein $0<x, y, z<1$; $0<x+y+z<1$; and $0<q<1$.

2. The phosphor according to claim 1, wherein $0.2 \leq q < 1$.

3. The phosphor according to claim 1, wherein $0<q \leq 0.2$.

4. The phosphor according to claim 1, wherein q is in a range from about 0.2 to about 1, x is in a range from about 0.005 to about 0.3; y is in a range from about 0.005 to about 0.2; and z is in a range from about 0.3 to about 0.9.

5. The phosphor according to claim 1, wherein q is in a range from about 0.2 to about 1, x is in a range from about 0.005 to about 0.2; y is in a range from about 0.005 to about 0.1; and z is in a range from about 0.4 to about 0.7.

6. A phosphor comprising a material having a formula of $(La_{1-x-y-z}Tb_xCe_yGd_z)(P_{1-q}B_q)O_4$; wherein $0<x+y<1$; $0<x+y+z<1$; $0 \leq q<1$; and $0.3<z<1$.

* * * * *